United States Patent
Murray, Jr. et al.

(10) Patent No.: US 8,156,797 B2
(45) Date of Patent: Apr. 17, 2012

(54) METHOD AND APPARATUS FOR OVERMOLDING A TIRE PRESSURE MONITOR SENSOR

(75) Inventors: Neil G. Murray, Jr., Wixom, MI (US); Yoshihiko Shimokawa, Howell, MI (US)

(73) Assignee: TRW Automotive U.S. LLC, Farmington Hills, MI (US)

( * ) Notice: Subject to any disclaimer, the term of this patent is extended or adjusted under 35 U.S.C. 154(b) by 324 days.

(21) Appl. No.: 12/510,696

(22) Filed: Jul. 28, 2009

(65) Prior Publication Data

US 2010/0018302 A1 Jan. 28, 2010

Related U.S. Application Data

(60) Provisional application No. 61/084,055, filed on Jul. 28, 2008.

(51) Int. Cl.
*B60C 23/02* (2006.01)
(52) U.S. Cl. .......................... 73/146.5; 73/146
(58) Field of Classification Search .................. None
See application file for complete search history.

(56) References Cited

U.S. PATENT DOCUMENTS

| | | | |
|---|---|---|---|
| 5,654,111 A | 8/1997 | Minomiya et al. | |
| 6,647,772 B2 | 11/2003 | Ito et al. | |
| 6,817,217 B2 | 11/2004 | McGuire et al. | |
| 6,958,684 B2 * | 10/2005 | Lin et al. | 340/447 |
| 6,993,962 B1 * | 2/2006 | Ko | 73/146.5 |
| 7,281,421 B2 * | 10/2007 | Yin et al. | 73/146.8 |
| 7,284,418 B2 * | 10/2007 | Yin et al. | 73/146.8 |
| 7,359,212 B2 | 4/2008 | Mayuzumi et al. | |
| 7,500,394 B2 | 3/2009 | Steele | |
| 2004/0046649 A1 * | 3/2004 | Sanchez et al. | 340/443 |
| 2005/0068746 A1 | 3/2005 | Weisz-Margulescu et al. | |
| 2006/0061010 A1 | 3/2006 | Huonker | |
| 2007/0040663 A1 | 2/2007 | Steele | |
| 2008/0084005 A1 | 4/2008 | Steele et al. | |

* cited by examiner

*Primary Examiner* — Lisa Caputo
*Assistant Examiner* — Jermaine Jenkins
(74) *Attorney, Agent, or Firm* — Tarolli, Sundheim, Covell & Tummino LLP

(57) ABSTRACT

A tire pressure monitoring apparatus includes a valve assembly mountable in a vehicle wheel and a housing securable to the end of the valve assembly. A pressure sensor assembly is securable in the housing for monitoring tire pressure and providing an electrical signal indicative thereof. The pressure sensor assembly includes a flexible circuit board, and a battery held within a fold of the flexible circuit board, wherein the flexible circuit board is overmolded.

9 Claims, 3 Drawing Sheets

METHOD AND APPARATUS FOR OVERMOLDING A TIRE PRESSURE MONITOR SENSOR

RELATED APPLICATION

This application claims priority from U.S. Provisional Patent Application Ser. No. 61/084,055, filed Jul. 28, 2008, the entirety of which is incorporated herein by reference.

FIELD OF THE INVENTION

The present invention is directed to tire pressure monitors and is more particularly directed to a method and apparatus for overmolding a tire pressure monitor.

BACKGROUND OF THE INVENTION

It is known to attach a tire pressure monitoring ("TPM") sensor assembly to a rim of a vehicle wheel. The TPM sensor assembly includes an electronic tire pressure sensor and a power source, such as a battery. The tire pressure sensor senses the air pressure in the tire and transmits an electronic signal, such as a radio-frequency ("RF") signal, to an on-board vehicle receiver. The receiver evaluates the signal and provides an alarm to a vehicle occupant if the pressure in the tire is too low. A TPM sensor assembly may monitor other tire conditions such as tire temperature, etc.

TPM sensor assemblies of various types are known. One particular type of TPM sensor assembly includes a housing strapped to its associated wheel. Other known TPM sensor assemblies may include the valve stem assembly itself. Such valve stem mounted TPM sensors have the sensor mounted to the end of a valve stem assembly. Such valve stem/TPM sensor assemblies may include a soft elastomeric material surrounding the valve stem that seals against an associated mounting hole in the wheel as the assembly is snapped into place. During mounting, the valve stem is pulled through a receiving hole of the wheel. Such valve stems are known in the art as snap-in valve stems. The TPM sensor of the assembly senses tire pressure and/or tire temperature and sends appropriate radio frequency information including a unique tire identification ("ID") code, sensed tire pressure, and sensed tire temperature to a vehicle on-board receiver for information display to the vehicle operator.

SUMMARY OF THE INVENTION

In accordance with one example embodiment of the present invention, a tire pressure monitoring apparatus is provided including a valve assembly mountable in a vehicle wheel and a housing securable to the end of the valve assembly. A pressure sensor assembly is securable in the housing for monitoring tire pressure and providing an electrical signal indicative thereof. The pressure sensor assembly includes a flexible circuit board, and a battery held within a fold of the flexible circuit board, wherein the flexible circuit board is overmolded.

In accordance with another example embodiment of the present invention, a tire pressure monitoring apparatus is provided comprising a pull-through valve assembly mountable in a vehicle wheel and a housing securable to the end of the pull-through valve assembly. A pressure assembly is securable in the housing for monitoring tire pressure and providing an electrical signal indicative thereof. The pressure sensor assembly includes a flexible circuit board, and a battery held within a fold of the flexible circuit board, wherein the flexible circuit board is overmolded.

In accordance with another example embodiment of the present invention, a method of manufacturing a tire pressure monitor is provided comprising the steps of folding a flexible tire pressure monitoring circuit board around a battery, overmolding the folded circuit board, attaching the overmolded circuit board to the end of a tire valve assembly, and mounting the valve assembly in a tire.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
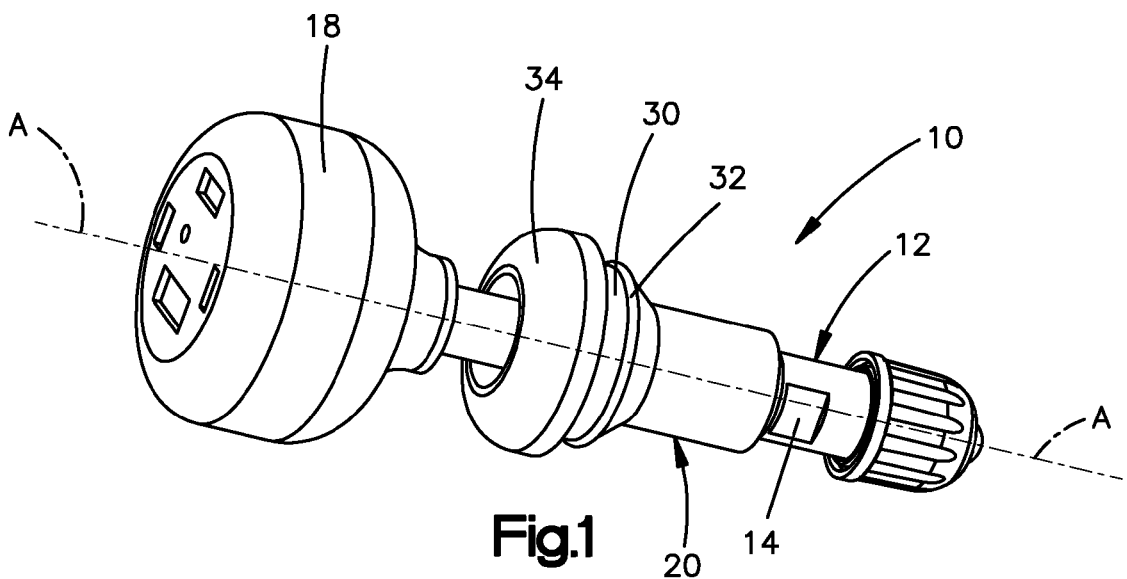
FIG. 1 is a schematic perspective view of a valve stem TPM sensor assembly made in accordance with one example embodiment of the present invention.

Referring to FIG. 1, a tire pressure monitoring device 10 includes a valve stem TPM sensor assembly 12 having an integrally connected valve mechanism 14, and housing 18 that allows for low cost manufacturing, assembly, and installation. The valve mechanism 14 has a valve body 20 that extends along an axis A-A and connects to the housing 18. The housing 18 provides an area for mounting monitoring, transmitting, and receiving electronics. The valve body 20 may be made from plastic, metal, or metal alloy, such as brass or any other material without departing from the spirit and scope of the claimed invention. In one example embodiment, the valve body 20 acts as a transmitting antenna for the TPM device 10.

Figure 2:
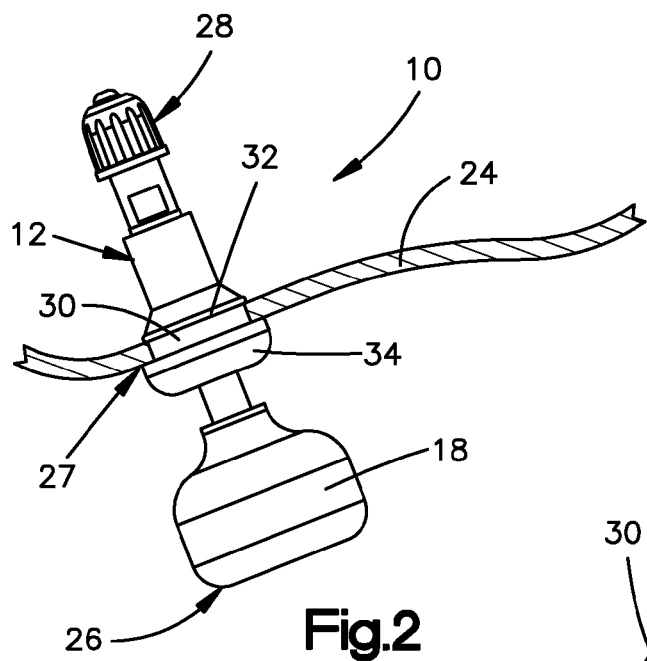
FIG. 2 is a side view of the valve stem TPM assembly of FIG. 1 mounted in a through hole of a vehicle wheel.
Figure 3:
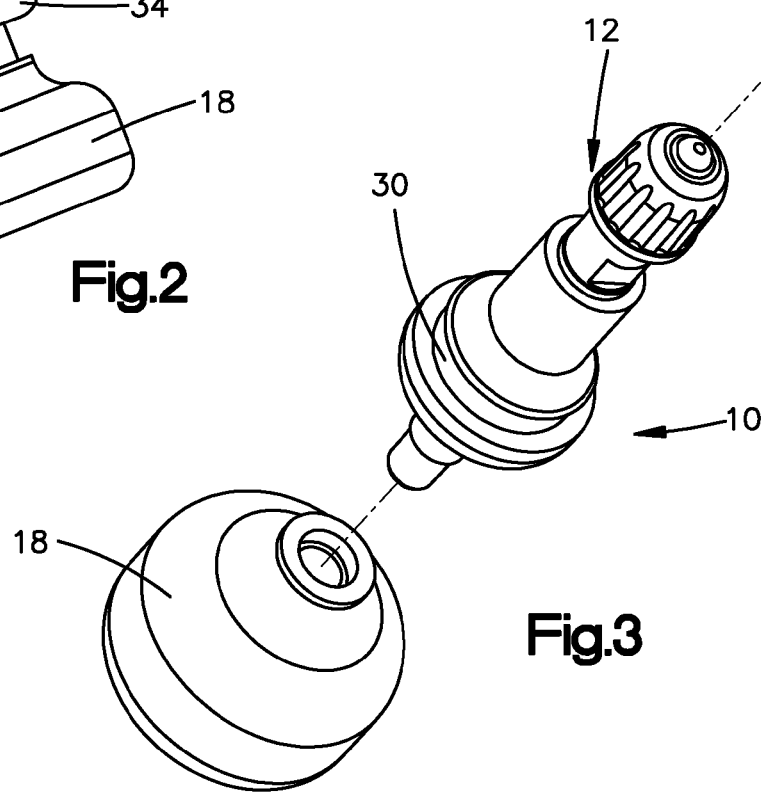
FIG. 3 is a partially exploded view of the valve stem TPM assembly of FIG. 1.

Referring to FIG. 2, a mounting arrangement between the tire pressure TPM device 10 and a tire rim 24 is shown. The pressure mounting device 10 includes an inside end 26 (located inside the tire (not shown)) and an outside end 28 with respect to the tire rim 24. The tire pressure mounting device 10 is secured to the tire rim 24 by inserting the device through a hole 27 located on the rim. The tire pressure mounting device 10 is advanced through the hole 27 until the tire rim 24 engages a cylindrical recess 30 that provides a sealing engagement between first and second shoulders 32, 34, respectively.

The outside portion of the wheel containing the outside end 28 is typically at atmospheric pressure and the inside portion of the wheel containing the inside end 26 (located inside the tire (not shown)) is typically maintained at a pressure greater than atmosphere. To achieve this pressure differential, fluid is transported through the valve stem TPM assembly 12 to the inside of the wheel (tire) via a fluid passage in the valve assembly (not shown) to an exit orifice (not shown) provided in the housing 18.

Figure 4:
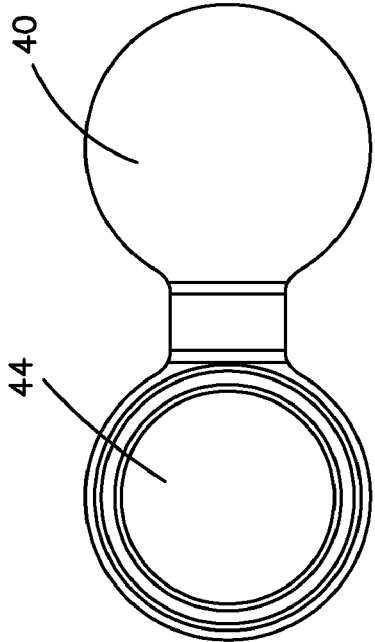
FIG. 4 is a top view of a flexible circuit board in accordance with an example embodiment of the present invention showing circuitry mounted thereon.

As mentioned, within the housing 18 are the electronics for sensing the tire conditions and for transmitting to a vehicle on-board receiver an RF signal having information related to the sensor ID, and sensed tire conditions. Referring to FIGS. 4-7, the electronics 42 for the TPM sensor assembly are carried on a flexible circuit board 40. The electronics may take the form of discrete circuit components, an application specific integrated circuit ("ASIC"), a microcomputer, etc., and/or any combination thereof. As can be seen in FIG. 4, an integrated circuit 42 is mounted to the flexible circuit board 40.

Figure 5:
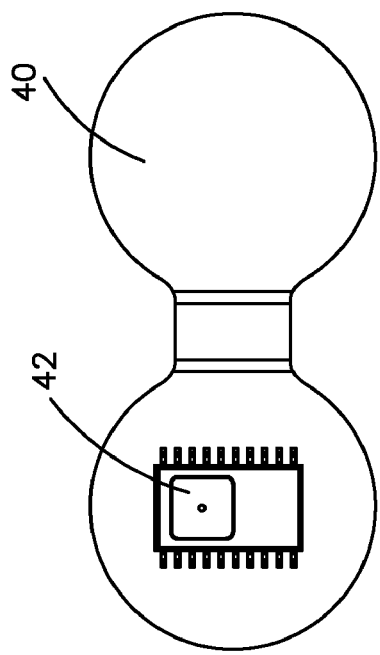
FIG. 5 is a bottom view of flexible circuit board of FIG. 4 showing a battery mounted thereon.
Figure 7:
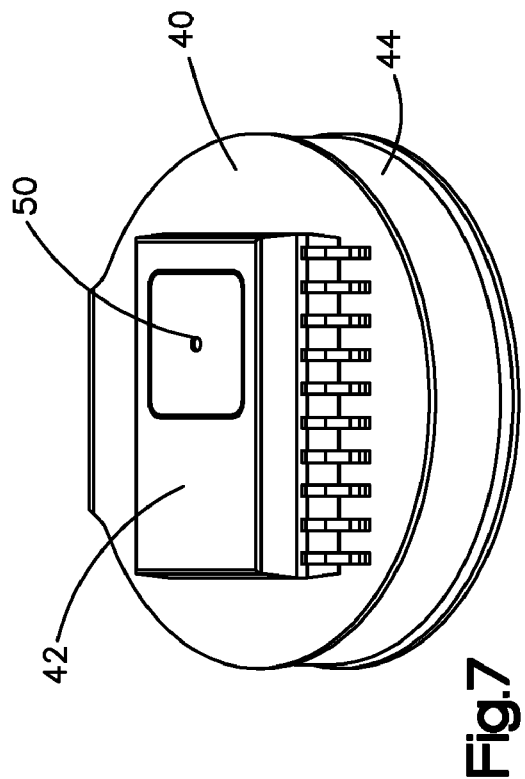
FIG. 7 is a side view of flexible circuit board of FIG. 4 fully flexed over into a folded condition.
Figure 6:
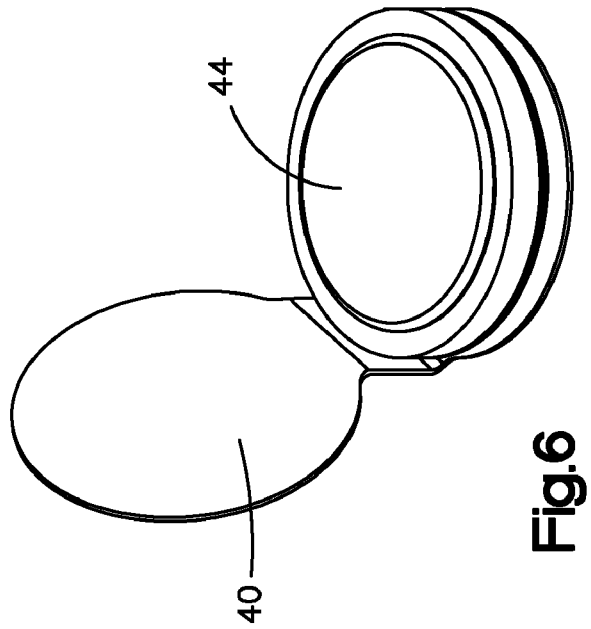
FIG. 6 is a side view of flexible circuit board of FIG. 4 partially folded.
Figure 8:
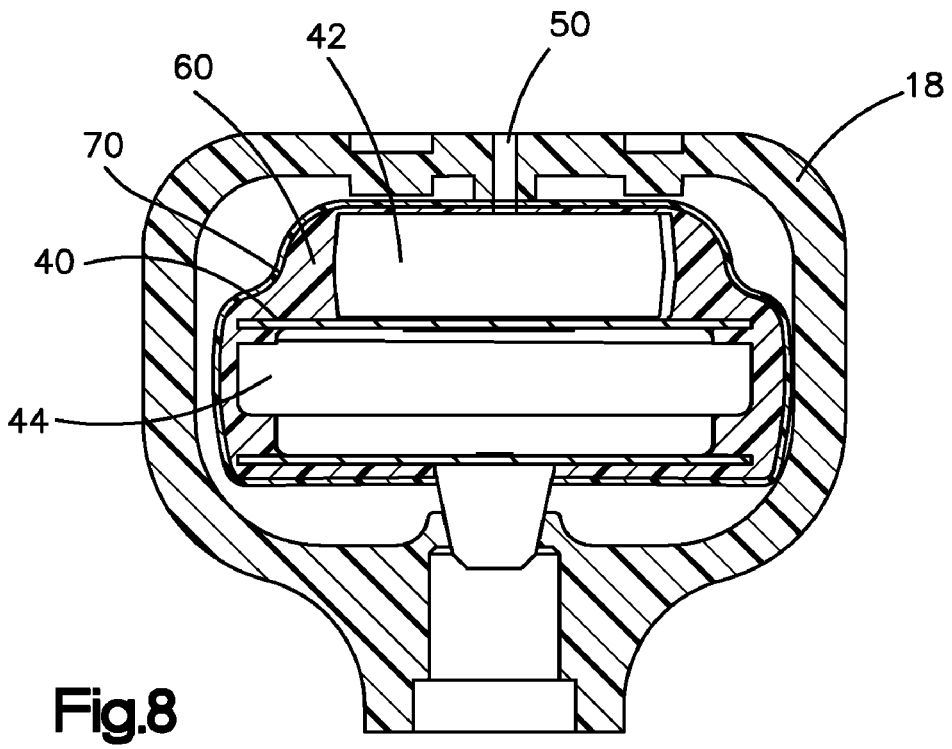
FIG. 8 is a partial sectional view of the sensor assembly showing the folded circuit board of FIG. 7 mounted in the sensor assembly of FIG. 1.
Figure 9:
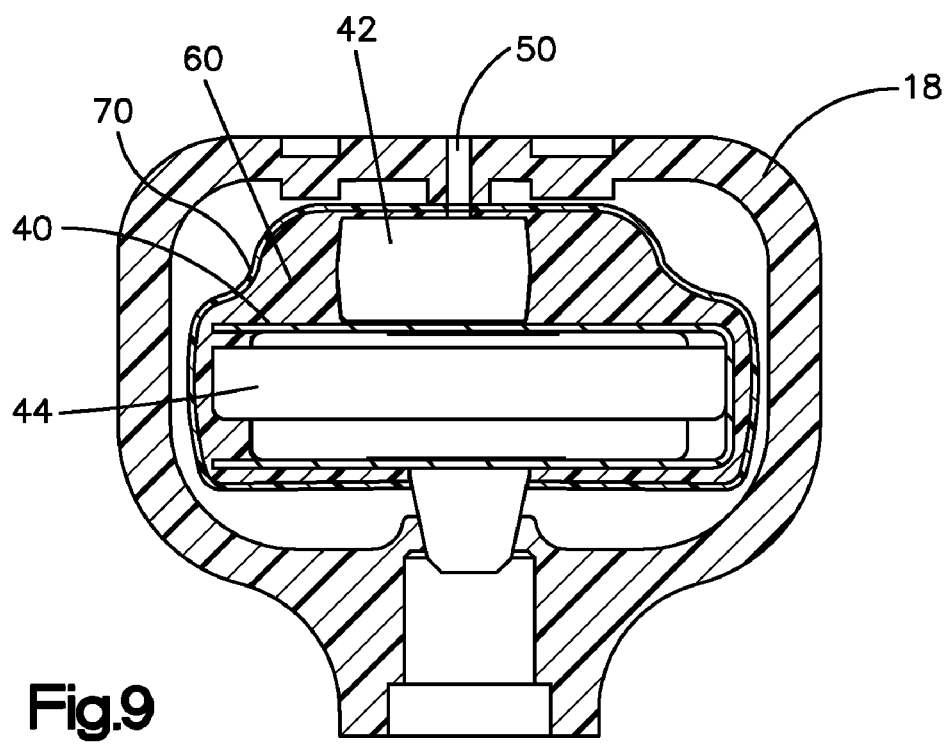
FIG. 9 is another partial sectional view of the sensor assembly showing the folded circuit board of FIG. 7 mounted in the sensor assembly of FIG. 1.

As viewed in FIG. 5, a coin style battery 44 is used to supply electrical power for the TPM sensor assembly. The battery 44 has two faces, one face is the negative terminal and the other face is the positive terminal. On the opposite side of the circuit board from the mounted circuit components 42, the battery 44 is mounted. In an unfolded condition, one terminal of the battery is electrically connected to the board 40. To connect the other terminal of the battery so as to provide operating power to the board and, in turn, the circuit components 42, the circuit board 40 is folded over onto the other side of the battery 44. As seen in FIGS. 6-9, the flexible circuit board 40 is folded around the battery 44 so as to hold the battery 44 and provide the necessary electrical connections between the battery and the circuitry 42. In addition, the electronic assembly, the printed circuit board assembly ("PCBA") including the circuitry 42 and the battery 44 are overmolded to protect the circuitry from environmental conditions.

The PCBA is overmolded with a first inner layer 60 of Thermoplastic Elastomer ("TPE") and a second outer layer 70 of Nylon material so as to provide environmental protection. The thermoplastic elastomer inner layer 60 bonds to the electronic devices 40, 42, 44, providing environmental protection as well as providing a protective layer of soft polymer so that the solder joints attaching the electronic components to the flexible circuit board 40 are not degraded through coefficient of thermal expansion miss-match. The adhesion of the TPE to the flexible circuit board 40 and its electronic components 42, 44 prevent moisture ingress. A hard outer layer of nylon 70 is then over molded around the TPE 60 so that further mechanical protection is provided. Since the nylon outer layer 70 establishes a chemical bond to the TPE inner layer 60, no moisture plain is formed between the two polymer materials. The bonding of the TPE inner layer 60 and nylon outer layer 70 to the pressure sensing circuitry 42 provides for a molded pressure path 50 from the outside of the package to the pressure sensing circuitry 42. During the overmolding process, a sensing hole 50 must be maintained to the sensor portion of the TPM circuitry 42 so that the pressure on the inside of the tire can communicate with the sensor and be monitored by the sensor circuitry.

From the above description of the invention, those skilled in the art will perceive improvements, changes and modifications. Such improvements, changes and modifications within the skill of the art are intended to be covered by the appended claims.

Having described the invention, the following is claimed:

1. A tire pressure monitoring apparatus comprising:
   a valve assembly mountable in a vehicle wheel;
   a housing securable to the end of the valve assembly;
   a pressure sensor assembly securable in the housing for monitoring tire pressure and providing an electrical signal indicative thereof, said pressure sensor assembly including,
   a flexible circuit board, and
   a battery held within a fold of the flexible circuit board,
   wherein the flexible circuit board is overmolded with a first layer and a second layer.

2. The tire pressure monitor apparatus of claim 1 wherein the pressure sensor assembly further includes circuitry for monitoring the tire pressure and transmitting a signal indicative thereof.

3. The tire pressure monitor apparatus of claim 1 wherein said first layer is an inner layer made of a soft material and said second layer is an outer layer made of a hard material.

4. A tire pressure monitoring apparatus comprising:
   a pull-through valve assembly mountable in a vehicle wheel;
   a housing securable to the end of the pull-through valve assembly;
   a pressure assembly securable in the housing for monitoring tire pressure and providing an electrical signal indicative thereof, said pressure sensor assembly including,
   a flexible circuit board, and
   a battery held within a fold of the flexible circuit board,
   wherein the flexible circuit board is overmolded with a first layer and a second layer.

5. The tire pressure monitor apparatus of claim 4 wherein the pressure sensor assembly further includes circuitry for monitoring the tire pressure and transmitting a signal indicative thereof.

6. The tire pressure monitor apparatus of claim 4 wherein said first layer is an inner layer made of a soft material and said second layer is an outer layer made of a hard material.

7. A method of manufacturing a tire pressure monitor comprising the steps of:
   folding a flexible tire pressure monitoring circuit board around a battery;
   overmolding the folded circuit board with a first layer and a second layer;
   attaching the overmolded circuit board to the end of a tire valve assembly; and
   mounting the valve assembly in a tire.

8. The method of manufacturing a tire pressure monitor of claim 7 further comprising the steps of mounting circuitry for monitoring the tire pressure and transmitting a signal indicative thereof to the circuit board.

9. The method of manufacturing a tire pressure monitor of claim 7 wherein the step of overmolding includes molding the first layer as an inside layer using a soft material and the second layer as an outside layer using a hard material.

* * * * *